United States Patent [19]

Goetz

[11] Patent Number: 5,233,615
[45] Date of Patent: Aug. 3, 1993

[54] INTERRUPT DRIVEN, SEPARATELY CLOCKED, FAULT TOLERANT PROCESSOR SYNCHRONIZATION

[75] Inventor: Jay R. Goetz, Minnetonka, Minn.

[73] Assignee: Honeywell Inc., Minneapolis, Minn..

[21] Appl. No.: 711,638

[22] Filed: Jun. 6, 1991

[51] Int. Cl.⁵ .............................................. G06F 11/18
[52] U.S. Cl. .................................. 371/36; 395/575; 371/68.3
[58] Field of Search ................. 371/36, 61, 62, 68.1, 371/68.3; 395/575, 200, 375

[56] References Cited

U.S. PATENT DOCUMENTS

| | | | |
|---|---|---|---|
| 4,497,059 | 1/1985 | Smith | 371/36 |
| 4,733,353 | 3/1988 | Jaswa | 364/200 |
| 4,937,741 | 6/1990 | Harper et al. | 364/200 |
| 5,193,175 | 3/1993 | Cutts, Jr. et al. | 395/575 |

FOREIGN PATENT DOCUMENTS 0372580 12/1989 European Pat. Off. .

OTHER PUBLICATIONS

The Fifteenth Annual International Symposium on Fault-tolerant Computing, Jun. 19-21, 1985, pp. 246-251, IEEE, N.Y., U.S.; T. Yoneda et al, "Implementation of Interrupt Handler for Loosely-Synchronized TMR Systems" (see p. 246, right col., line 26-p. 248, right col., line 39, FIGS. 1-5).

Primary Examiner—Vincent P. Canney
Attorney, Agent, or Firm—Robert A. Pajak

[57] ABSTRACT

A N-modular redundancy fault tolerant computing system comprises a plurality of microprocessors having their data outputs applied simultaneously to a voter. In accordance with this invention, the system can be event driven while still maintaining synchrony. This is accomplished by providing timing means for establishing a predetermined program execution interval comprised of a fixed number of clock cycles for the plurality of computer means of the N-modular fault tolerant system, the timing means assuring that all of said computer means achieve an identical machine state at the end of the predetermined program execution interval.

4 Claims, 2 Drawing Sheets

INTERRUPT DRIVEN, SEPARATELY CLOCKED, FAULT TOLERANT PROCESSOR SYNCHRONIZATION

BACKGROUND OF THE INVENTION

I. Field of the Invention

This invention relates generally to highly reliable, fault tolerant digital data processing systems, and more particularly to an N-modular redundancy microprocessor system in which the plural processors may be event-driven but remain in synchronization.

II. Discussion of the Prior Art

It is well known in the digital computing arts to employ a multiplicity of redundant processors to achieve fault tolerant operation, i.e., a microprocessor system capable of error-free operation in spite of one or more hardware faults. The most common prior art fault tolerant architecture is referred to as N-modular redundancy where N represents an odd number greater than one, and typically three or five. The N identical processors are programmed to execute identical programs in synchrony in response to a common set of input signals (data). Fault tolerance is achieved by continuously voting on the output signals produced by each processor in a majority decision logic voter. The result of the voting circuit is guaranteed to be correct, provided a majority of the processors compute a correct result. Synchronization may be established on instruction boundaries or, alternatively, for each processor clock cycle. In either case, voting is typically performed for each instruction, thus requiring that all processors execute identical programs in lock step.

It is also well known in the digital computing arts to employ interrupts to perform what is known as "event-driven computing". Interrupts allow the processor to function more efficiently in real-time applications, such as inertial navigation and flight control. In such systems, the processor is responsive to input signals which occur in real time, i.e., asynchronously with respect to the processor clock. Interrupts are the means by which program execution of an interrupt program sequence is temporarily suspended while an interrupt subroutine, often termed the service routine, processes the input data associated with the interrupt. The last step of any interrupt subroutine is the execution of a Return-From-Interrupt instruction such that execution of the instant program resumes exactly at the point where its suspension occurred.

Typical microprocessor systems are responsive to a multiplicity of interrupts and provide circuitry to prioritize and selectively mask interrupts. The Type 8259 Programmable Interrupt Controller manufactured by the Intel Corporation may be considered typical. Any real-time program must be written to assure that any combination of asynchronous events which generate interrupt requests will result in an orderly execution of the associated interrupt subroutines. To accomplish this, the interrupt controller must periodically strobe or sample the state of the multiple interrupt request lines with a signal derived from the processor clock. The set of interrupt request samples is processed by a priority encoder to determine which of simultaneous requests will be processed first. The interrupt controller then generates an interrupt signal to trigger execution of the associated service routine when the execution of the present instruction is complete.

Those skilled in the art can appreciate that it is not possible to assure the lock-step operation of plural redundant processors which is required for fault tolerant voting in accordance with the prior art when the processors are event-driven. When an interrupt request occurs simultaneous with the strobe signal, the results may be indeterminant. In spite of the best efforts to synchronize the processor clocks to one another and thereby synchronize interrupt request sampling, an event that one processor may resolve as "in time", i.e., occurring before the strobe signal, another processor may resolve as "too late", i.e., occurring after the strobe signal. The result is that the programs of the respective processors are interrupted at different points in the program and majority voting is no longer valid since synchronization is lost. In a like manner, two nearly simultaneous events may be serviced in one order in a first processor and in the reverse order in a second processor. This likewise invalidates the voting. Thus, the prior art use of N-modular redundancy generally precludes an event-driven processor architecture.

It is accordingly a principal object of the present invention to provide a means of processor synchronization which permits a processor redundant processor architecture to be both event driven and fault tolerant, yielding a system exhibiting high reliability and functional efficiency not heretofore found in the prior art.

SUMMARY OF THE INVENTION

In accordance with the present invention, the foregoing object is achieved by providing a fault tolerant computing system having a plurality of microprocessors, each programmed to execute the same stored program of instructions in synchrony in response to a common set of data input signals where each of the plurality of microprocessors has its data output coupled in common to a majority decision logic voting means which operates to determine the extent of comparison of the data outputs of all of the processors. The system also includes a processor clock for each of the processors which produces timing pulses for timing the execution of the stored program by the microprocessors into clock cycles. Then, timing means are included for each of the plural processor employed which function to establish a predetermined program execution interval comprised of a fixed and identical number of clock cycles for all of the microprocessors employed in the redundant system, the timing means assuring that all of the microprocessors achieve an identical machine state at the conclusion of the program execution interval.

While the present invention will be described as including discrete logic modules external to the microprocessor, those skilled in the art can appreciate that the invention may also be practiced in software executed by the microprocessors themselves.

DESCRIPTION OF THE DRAWINGS

The foregoing features, objects, and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
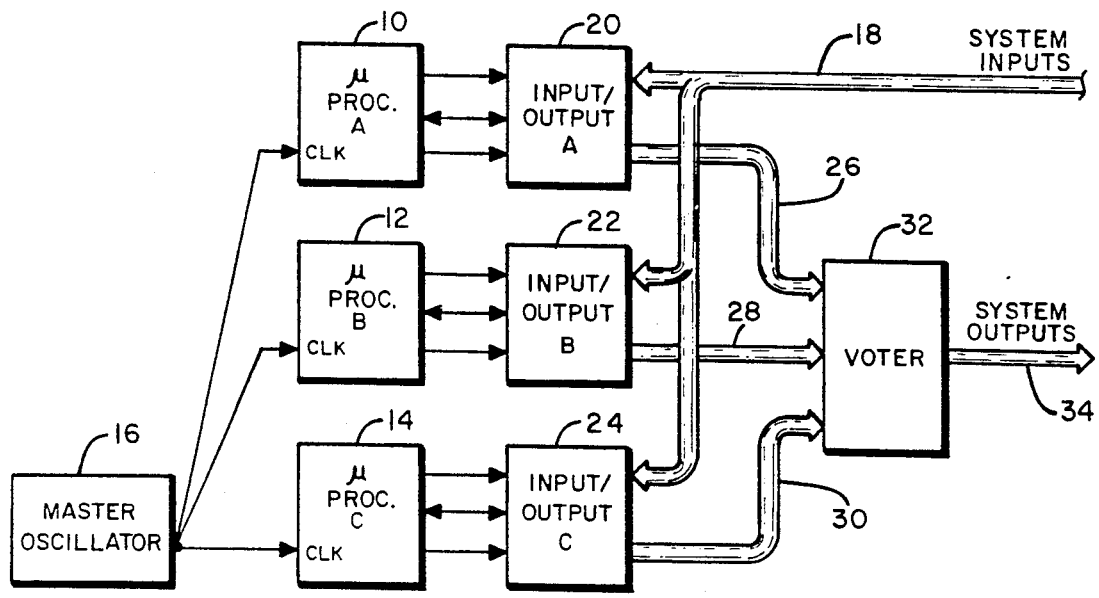
FIG. 1 illustrates a system block diagram of a typical prior art, triple-modularly-redundant fault tolerant system.

FIG. 1 comprises a general block diagram of a prior art, N-modular redundancy, fault-tolerant architecture in which N equals three. It is to be understood that the program memory and data memory which are not explicitly shown in FIG. 1 may be part of the microprocessor or, optionally, may be added to the microprocessor bus. The three processors 10, 12 and 14 are maintained in synchronism by virtue of being driven by a common master oscillator 16 which is connected to provide the clock source for each of the microprocessors. System inputs are provided in common, via bus 18 and input/output interfaces 20, 22 and 24 to each of the plural microprocessors. Likewise, each of the plural microprocessors provides output data via the buses 26, 28 and 30 to voter logic 32 such that the system outputs on bus 34 correspond to majority agreement between the plural inputs to the voter.

As mentioned above, voting is typically performed for each instruction, thus requiring all processors to execute identical programs in lock step. The prior art system of FIG. 1 is incapable of operating in an event-driven mode.

Figure 2:
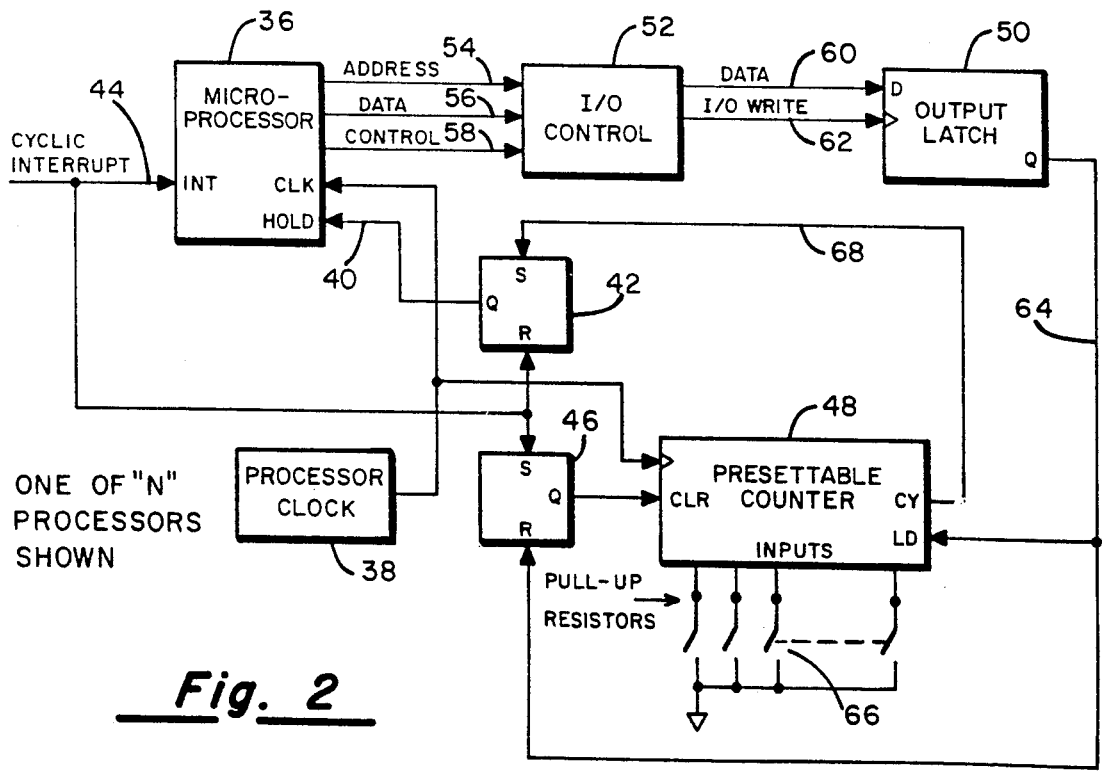
FIG. 2 is a logical block diagram illustrating the principles of the invention.

Referring next to FIG. 2, there is shown a single microprocessor 36 and the associated logic circuitry which will allow that microprocessor to be used along with other redundant microprocessors, identical to those shown in FIG. 2, in configuring a N-modular redundancy fault tolerant processor capable of operating in an event-driven mode. With no limitation intended, the microprocessors employed in the system may preferably comprise a RISC (Reduced Instruction Set Computer). Type 8960 microprocessor manufactured by the Intel Corporation. Such microprocessors sequentially execute a stored program in response to clock signals from a processor clock 38 provided that the "hold" signal on line 40 is low. Whenever the "hold" signal goes high, program execution is suspended. The remainder of the circuitry of FIG. 2 functions to define a computational frame, i.e., a specified period of time during which a specified number of clock cycles are executed. An essential feature of the invention is that all of the plural microprocessors in the N-modular redundant system are guaranteed to execute the identical number of clock cycles in each computational frame, even though the frequency of their individual processor clocks may vary within a practical tolerance.

At the end of each computational frame, set/reset flip-flop 42 is set and the microprocessor 36 is put in the "hold" mode. The start of a computational frame is established by a cyclic interrupt signal on line 44 which is applied simultaneously to the interrupt input terminal (INT) of each of the redundant microprocessors 36 employed in the system from a master timing source (not shown). The assertion of the cyclic interrupt on line 44 causes three concurrent actions: (1) a set/reset flip-flip 46 is set, thus holding the presettable counter 48 in its "cleared" state; (2) flip-flip 42 is reset, thus releasing the "hold" on microprocessor 36; and (3) an interrupt is initiated in microprocessor 36.

The microprocessor 36 and its associated program can be considered to be a state machine, albeit a very complex one. This means that the results produced by the microprocessor are deterministic and that multiple microprocessors executing identical programs will produce identical results response to a common interrupt signal, provided that all microprocessors have been placed in the "hold" mode at the same program address. Microprocessor 36 will enter its interrupt service routine a predetermined number of clock cycles after the occurrence of the cyclic interrupt. A predetermined number of clock pulses later, an output instruction is executed to set output latch 50. Specifically, I/O control 52 has the structure typical of conventional memory mapped I/O. Thus, a write instruction of a predetermined data pattern to a predetermined address, via lines 54, 56 and 58, will set data line 60 to the logical "1" state and will generate a clock pulse on I/O write line 62. A subsequent write instruction is used to reset the output latch 50. When that latch is set, the load signal on line 64 causes a predetermined binary value established by a switch register 66 to be "jammed" into the presettable down counter 48. When output latch 50 has been reset, the counter 48 begins to decrement with each processor clock cycle. When counter 48 reaches a count of 0, the next positive transition of the processor clock 38 generates a carry-out signal (CY) on line 68 which functions to set the flip-flop 42, thereby synchronously asserting the "hold" signal for the microprocessor 36. Program execution is suspended at this point until the next cyclic interrupt on line 44 releases the microprocessor 36 from its "hold" mode.

It can be seen, then, that the aforementioned circuitry provides a means to execute a predefined number of clock cycles in response to each cyclic interrupt. For example, consider a typical system employing a 10 Hz clock with a frequency tolerance of plus or minus 0.005% and a computation frame period of 10 microseconds. A microprocessor running with the slowest possible processor clock could reliably execute 99993 clock cycles and yet be assured of reaching the "hold" state before the next cyclic interrupt takes place. Assuming that output latch 50 is reset 16 clock cycles after the cyclic interrupt, a binary value of 11000011010001001 (99977 decimal) will accomplish this result. The hold interval at the end of each computational cycle allows the slowest microprocessor an opportunity to catch up with the fastest microprocessor so that the next computational frame starts in synchronization. Within a given frame, the divergence from synchronization is limited to only a few clock cycles, five in the above example, by the processor clock frequency tolerance. This divergence is readily tolerated by the voting circuitry provided that each output state to be voted is stable for more than five clock cycles and voting is not performed until five clock cycles have elapsed after any state transition at the voter inputs. Voting is thus performed within a window of time when the microprocessors are outputting corresponding data in spite of a slight synchronization divergence.

From the foregoing discussion, it is clear that synchronization is maintained within an acceptable tolerance when the cyclic interrupt is the only asynchronous stimulus. Further, it is possible to maintain such synchronization with any number of additional interrupts provided the following constraints are observed: 1) all microprocessors must sense the identical set of interrupts within a computational frame, 2) servicing of all interrupts sensed in a given computational frame must complete within that frame, and 3) a common order of interrupt servicing must be enforced or, alternatively, the microprocessor outputs must be independent of the order of interrupt servicing. The system can tolerate the additional divergence temporarily caused by event interrupts, recognizing that even though each microprocessor may thread the program differently while servicing the interrupts, each path involves an identical number of clock cycles so that the system will reconverge within the processor clock tolerances when interrupt servicing is complete. Hence, each computational frame still ends with all microprocessors in an identical state, i.e., in a hold mode. The contents in data memory and CPU registers, particularly the program address register will be identical.

The above constraints are satisfied by controlling the time when interrupt requests are sampled and by organizing the program into partitions which can be assured to complete within a single computational frame. Preferably, all event interrupt requests should be resynchronized by a clock which is coherent multiple of the cyclic interrupt. The common set of resynchronized interrupt requests is provided to the interrupt controller associated with each microprocessor. This establishes a set of windows during which interrupts can occur for each computational frame. The frequency of this clock should be chosen such that a sufficiently high sampling rate is achieved while at the same time assuring that the latest interrupt in any computational frame will be serviced within that frame.

It can be seen then that timing means are provided for establishing a predetermined program execution interval comprised of a fixed number of clock cycles for the plurality of computer means of the N-modular fault tolerant system, the timing means assuring that all of said computer means achieve an identical machine state at the end of the predetermined program execution interval.

Figure 3:
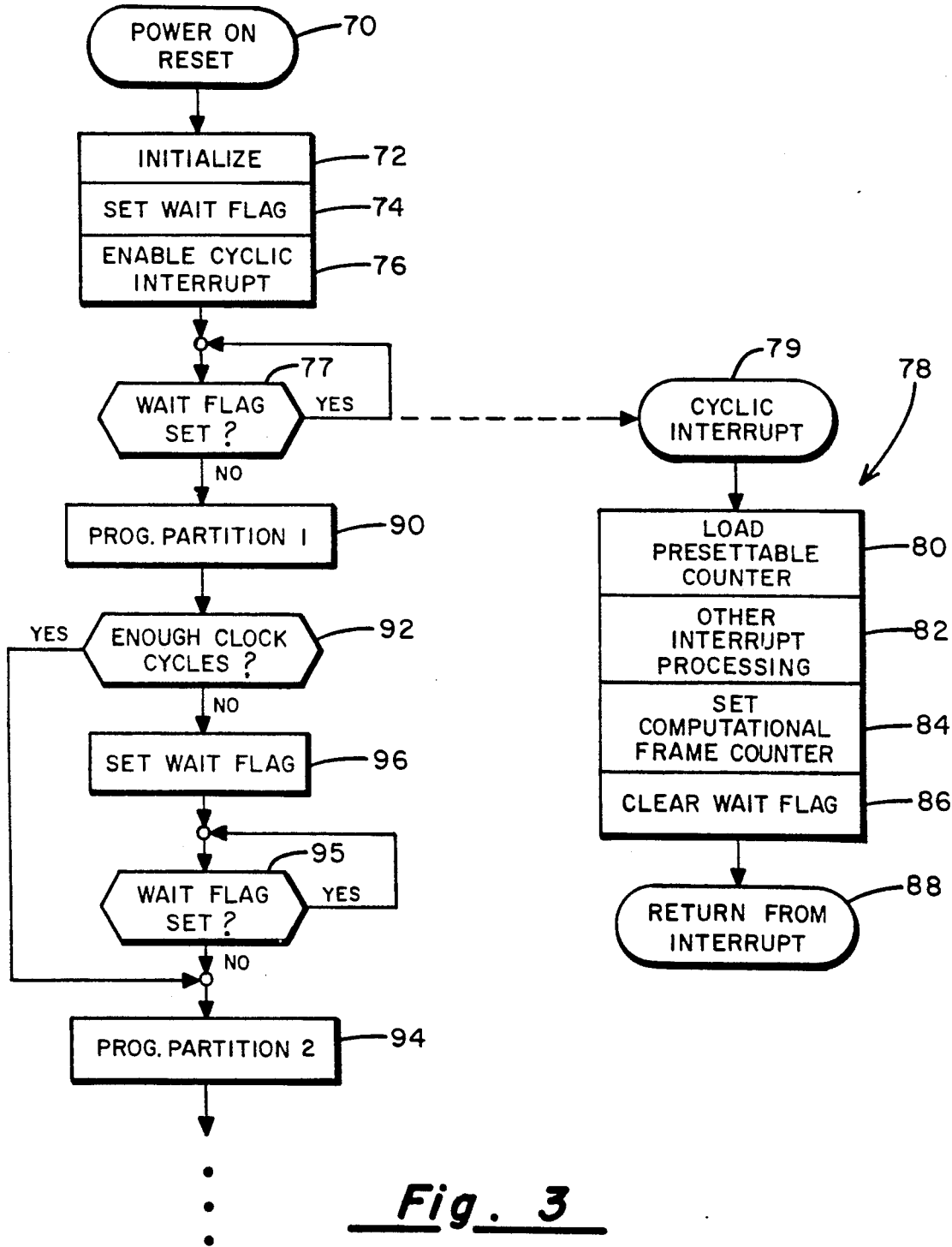
FIG. 3 is a program flow chart illustrative of the general program organization required to practice the instant invention.

FIG. 3 is a generalized program flow diagram which is illustrative of how any program, which is concurrently executed on an N-modular set of microprocessors may be organized to satisfy the aforementioned constraints. At the initial event of a "Power-on Reset", (block 70) interrupts are disabled and the microprocessors begin unsynchronized program execution. Each processor executes an initialization routine (block 72) to set its registers and data memory to identical predetermined values. Next, a Wait flag is set (block 74) which will only be reset when servicing a cyclic interrupt. Next, the cyclic interrupt is enabled (block 76), following which the microprocessors enter a tight loop waiting for the Wait flag to be reset. This provides the required initial synchronization. The next cyclic interrupt causes program execution to switch to the cyclic interrupt routine indicated generally by numeral 78, the first step of which (block 80) is to load the presettable down counter 48 in the manner previously described.

When all other interrupt processing is complete (block 82), a programmable counter indicative of the number of clock cycles per computational frame is set (block 84), the Wait flag is reset (block 86) and a "Return-from-Interrupt" instruction is executed (block 88) to jump back to the tight loop from whence the interrupt occurred. With the Wait flag now reset, execution falls through to execute program partition 1 (block 90). The last program step of any program partition is to decrement the computational frame counter by the number of clock cycles used in the execution of the program partition. Next, a test is performed to determine if the next scheduled program partition can be completely executed within the present computational frame (block 92). If the program partition can complete, the program branches to the next program partition (block 94). Otherwise, the Wait flag is set (block 96) to delay the execution of program partitional 2 until the next computational frame.

This simple example shows how a program may be organized to assure that all processors complete each computational frame in the identical machine state using a fixed rotational scheme to schedule program partitions. A more versatile scheme would be to select from the set of program partitions which are pending execution, the longest program partition which can complete within the present computational frame and setting the Wait flag only when there are no longer program partitions pending which can complete.

Although the preferred embodiment show the computational frame timing means to be external to microprocessor 36, portions, including all, of this circuitry may be included in the on-chip circuitry of the microprocessor itself without departing from the spirit of this invention.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A fault tolerant computing system comprising, in combination:
    (a) a plurality of microprocessors, each programmed to execute the same stored program of instructions in synchrony in response to a common set of data input signals, each of said plurality of microprocessors having its data output coupled in common to majority decision logic means, said majority decision logic means determining the extent of comparison of the data outputs of all of said plurality of microprocessors;
    (b) processor clock means individually associated with each of said plurality of microprocessors for producing timing pulses for timing the execution of said stored program of instructions by its microprocessor into clock cycles; and
    (c) timing means associated with each of said plurality of microprocessors for establishing a predetermined program execution interval comprised of a fixed and identical number of said clock cycles for all of said plurality of microprocessors, said timing means assuring that all of said plurality of microprocessors achieve identical machine states at the conclusion of said program execution interval.

2. The fault tolerant computing system as in claim 1 wherein said timing means for each of said microprocessor comprises:
    (a) clock pulse counting means coupled to receive said timing pulses for producing a first control signal when the count value accumulated therein reaches a predetermined value;
    (b) means controlled by the execution of said program of instructions by said microprocessor for loading said clock pulse counting means with a predetermined initial value;

(c) control means operatively associated with said clock pulse counting means and with said microprocessor and responsive to the receipt of a cyclic interrupt signal applied to all of said microprocessors simultaneously for initializing said clock pulse counting means prior to enabling said timing pulses from said processor clock to increment or decrement said initial value until said predetermined value is reached to produce said first control signal, said first control signal being applied to said control means for suspending execution of said stored program by said microprocessor until a next cyclic interrupt signal is applied to said microprocessor, said program execution interval being the interval between the occurrence of said cyclic interrupt signal and the production of said first control signal by said clock pulse counting means.

3. The fault tolerant computing system as in claim 1 wherein said timing means is internal to said plurality of microprocessors.

4. The fault tolerant computing system as in claim 1 wherein said timing means includes circuit means external to said plurality of microprocessors.

* * * * *